(12) United States Patent
Jing et al.

(10) Patent No.: US 12,477,702 B2
(45) Date of Patent: Nov. 18, 2025

(54) EMERGENCY COOLING SYSTEM AND METHOD FOR DATA CENTER AND DATA CENTER COOLING SYSTEM

(71) Applicant: Beijing Youzhuju Network Technology Co., Ltd., Beijing (CN)

(72) Inventors: Tangbo Jing, Beijing (CN); Qi Zhang, Beijing (CN); Xiaoliang Guo, Beijing (CN); Bing Gao, Beijing (CN); Jian Wang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/216,506

(22) Filed: May 22, 2025

(65) Prior Publication Data
US 2025/0287553 A1    Sep. 11, 2025

Related U.S. Application Data

(63) Continuation of application No. PCT/CN2023/132593, filed on Nov. 20, 2023.

(30) Foreign Application Priority Data

Nov. 23, 2022  (CN) .......................... 202211477997.0

(51) Int. Cl.
*H05K 7/20*    (2006.01)
(52) U.S. Cl.
CPC ..... *H05K 7/20836* (2013.01); *H05K 7/20745* (2013.01)
(58) Field of Classification Search
CPC .......... F24F 1/0035; F24F 11/30; F24F 11/64; F24F 11/65; F24F 2110/10; F24F 2110/12
See application file for complete search history.

(56) References Cited

U.S. PATENT DOCUMENTS 10,962,254 B2 * 3/2021 Ito .......................... F24F 12/006
2016/0021792 A1   1/2016 Minegishi et al.
(Continued)

FOREIGN PATENT DOCUMENTS

CN      204373116 U    6/2015
CN      207885066 U    9/2018
(Continued)

OTHER PUBLICATIONS

International Search Report and Written Opinion for International Application No. PCT/CN2023/132593, mailed on Dec. 5, 2023, 15 pages.
(Continued)

*Primary Examiner* — Darrin D Dunn
(74) *Attorney, Agent, or Firm* — Astute IP Law Group

(57) ABSTRACT

An emergency cooling system for a data center, including: a temperature sensor for detecting an indoor temperature of a room; an inlet valve disposed at a fresh air region and allowing outdoor air to enter the fresh air region in an open state; an exhaust valve disposed at an exhaust region of the room and allowing air in the exhaust region to be discharged outdoors in an open state; an exhaust fan for driving air in the exhaust region to be discharged outdoors; a return valve allowing air in the exhaust region to enter the fresh air region in the open state; and a control unit configured to: receive the detected indoor temperature; compare the indoor temperature with a predetermined temperature threshold; and in response to the indoor temperature exceeding the predetermined temperature threshold, open the inlet valve, the exhaust valve and the exhaust fan, and close the return valve.

20 Claims, 7 Drawing Sheets

(56) References Cited

U.S. PATENT DOCUMENTS

2016/0198593 A1     7/2016  Schmitt et al.
2019/0332149 A1*   10/2019  Shelnutt .............. F24F 5/0046

FOREIGN PATENT DOCUMENTS

| CN | 109451701 A   | 3/2019  |             |
|----|---------------|---------|-------------|
| CN | 111263562 A   | 6/2020  |             |
| CN | 111818783 A * | 10/2020 | H05K 7/20709 |
| CN | 112797488 A * | 5/2021  | F24F 1/0073 |
| CN | 112954955 A   | 6/2021  |             |
| CN | 214413312 U   | 10/2021 |             |
| CN | 215909275 U   | 2/2022  |             |
| CN | 216820477 U   | 6/2022  |             |
| CN | 115715076 A   | 2/2023  |             |

OTHER PUBLICATIONS

Office Action for Chinese Patent Application No. 202211477997.0, mailed on Apr. 28, 2025, 23 pages.
Office Action for Chinese Patent Application No. 202211477997.0, mailed on Dec. 19, 2024, 43 pages.
Office Action for Chinese Patent Application No. 202211477997.0, mailed on Feb. 21, 2025, 41 pages.

* cited by examiner

EMERGENCY COOLING SYSTEM AND METHOD FOR DATA CENTER AND DATA CENTER COOLING SYSTEM

CROSS-REFERENCE TO RELATED APPLICATIONS

The present application is a continuation of International Patent Application No. PCT/CN2023/132593, filed on Nov. 20, 2023, which claims priority to Chinese Patent Application No. 202211477997.0, filed on Nov. 23, 2022, and entitled "Emergency Cooling System and Method For Data Center and Data Center Cooling System", the entireties of which are incorporated herein by reference.

FIELD

Embodiments of the present disclosure generally relate to the technical field of cooling of data center, and more particularly, to an emergency cooling system and a method for a data center, and a data center cooling system.

BACKGROUND

With the rise of cloud computing, big data, internet of things, and artificial intelligence, the demand for large data center is increasing, and more and more core services are running on data center. How to design a stable and reliable data center while taking cost investment into account is crucial.

Indicators affecting the reliability of the data center are primarily embodied by service level agreement (SLA), which primarily involve three aspects, namely power availability, environmental availability (e.g., temperature and humidity), and network connectivity availability. Generally, the availability level of the data center needs to be between 99.9% and 99.999%, that is, it is necessary to ensure that the stable operation of the three aspects can be achieved at least 99.9% to 99.999% of the time in a year. In addition to the general power system availability and network connectivity availability can be ensured through multiple levels of redundancy design and operation maintenance processes, a data center cooling system has direct or indirect influence on the above three aspects, so system availability and failure recovery capability in emergency situations thereof are also becoming more and more important. In a case that a main cooling system of the data center fails, how to avoid damage to the data center caused by a thermal event is a challenge.

SUMMARY

In a first aspect of the present disclosure, an emergency cooling system for a data center is provided, including: a temperature sensor configured to detect an indoor temperature of a room of the data center; an inlet valve disposed at a fresh air region of the room, the inlet valve allowing outdoor air to enter the fresh air region in an open state, and preventing outdoor air from entering the fresh air region in a closed state; an exhaust valve disposed at an exhaust region of the room, the exhaust valve allowing air in the exhaust region to be discharged outdoors in an open state, and preventing air in the exhaust region from being discharged outdoors in a closed state; an exhaust fan disposed adjacent to the exhaust valve, to drive air in the exhaust region to be discharged outdoors when the exhaust valve is in the open state; an return valve disposed between the exhaust region and the fresh air region, the return valve allowing air in the exhaust region to enter the fresh air region in an open state, and preventing air in the exhaust region from entering the fresh air region in a closed state; and a control unit configured to: receive the indoor temperature detected by the temperature sensor; compare the indoor temperature with a predetermined temperature threshold; and in response to the indoor temperature exceeding the predetermined temperature threshold, open the inlet valve, the exhaust valve, and the exhaust fan, and close the return valve.

In a second aspect of the present disclosure, an emergency cooling method for a data center is provided, including: receiving an indoor temperature of a room of the data center detected by a temperature sensor; comparing the indoor temperature with a predetermined temperature threshold; and in response to the indoor temperature exceeding the predetermined temperature threshold, opening an inlet valve, an exhaust valve, and an exhaust fan, and closing a return valve, wherein the inlet valve is disposed at a fresh air region of the room, the inlet valve allows outdoor air to enter the fresh air region in an open state, and prevents outdoor air from entering the fresh air region in a closed state, wherein the exhaust valve is disposed at an exhaust region of the room, the exhaust valve allows air in the exhaust region to be discharged outdoors in an open state, and prevents air in the exhaust region from being discharged outdoors in a closed state, wherein the exhaust fan is disposed adjacent to the exhaust valve, to drive air in the exhaust region to be discharged outdoors when the exhaust valve is in the open state, and wherein the return valve is disposed between the exhaust region and the fresh air region, the return valve allows air in the exhaust region to enter the fresh air region in an open state, and prevents air in the exhaust region from entering the fresh air region in a closed state.

In a third aspect of the present disclosure, a data center cooling system is provided, including: the emergency cooling system according to a first aspect of the present disclosure; and a main cooling system including a cooling tower, a heat exchanging device and a blower, the cooling tower being disposed outside the room and connected to the heat exchanging device through a supply pipe and a return pipe, the heat exchanging device being disposed in the fresh air region to cool air in the fresh air region, and the blower being disposed in the fresh air region to guide air cooled by the heat exchanging device to an electronic device to be cooled.

It should be understood that the content described in this content section is not intended to limit the key features or important features of the embodiments of the present disclosure, nor is it intended to limit the scope of the present disclosure. Other features of the present disclosure will become readily understood from the following description.

BRIEF DESCRIPTION OF DRAWINGS

The above and other features, advantages, and aspects of various embodiments of the present disclosure will become more apparent from the following detailed description taken in conjunction with the accompanying drawings. In the drawings, the same or similar reference numbers refer to the same or similar elements, wherein.

DETAILED DESCRIPTION

Figure 1:
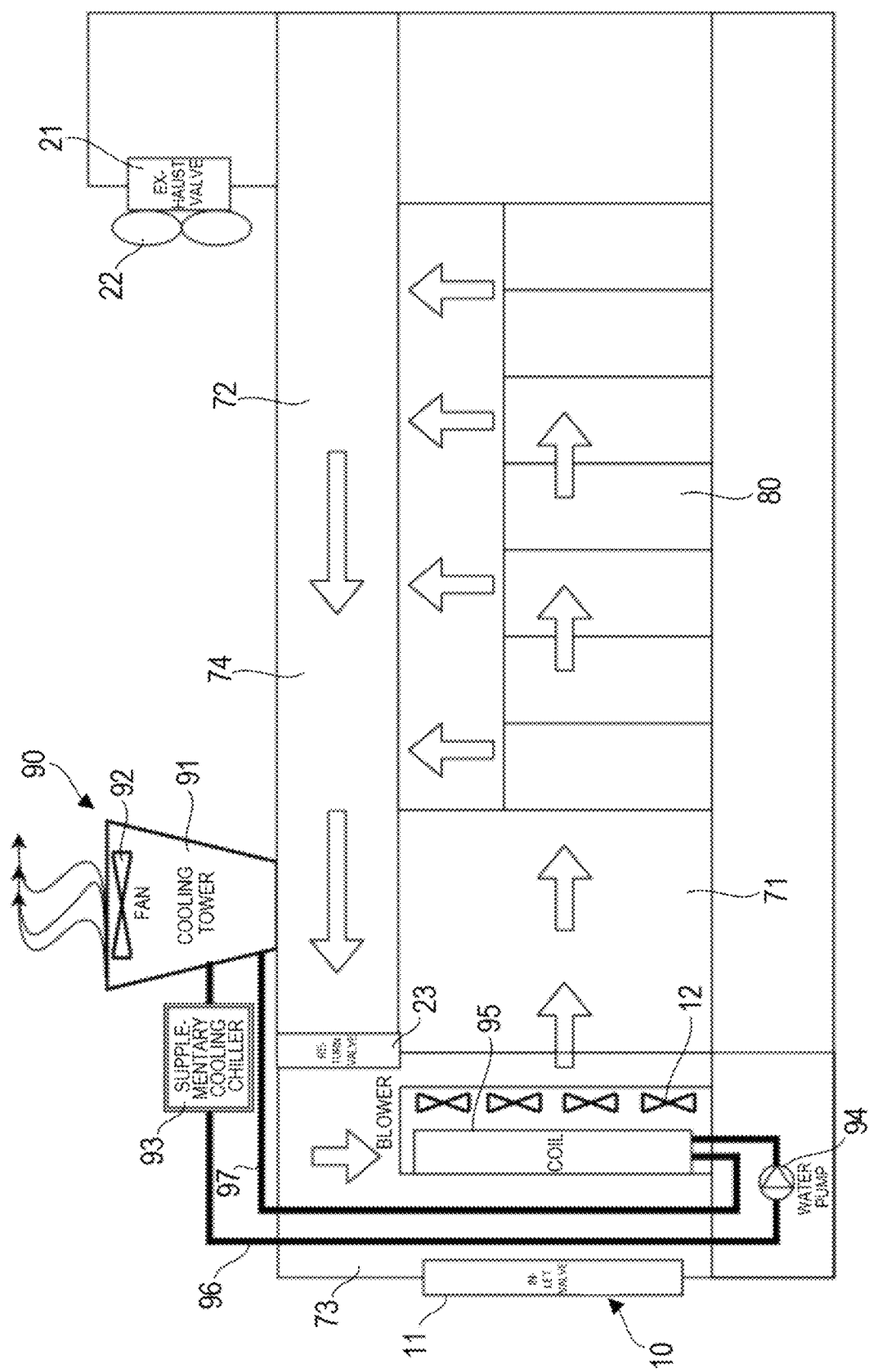
FIG. 1 to FIG. 3 show schematic structural diagrams of a data center cooling system according to one or more embodiments of the present disclosure.

Preferred embodiments of the present disclosure will be described in more detail below with reference to the accompanying drawings. While the preferred embodiments of the present disclosure are shown in the drawings, it should be understood that the present disclosure may be implemented in various forms and should not be limited by the embodiments set forth herein. Rather, these embodiments are provided to make this disclosure more thorough and complete, and to fully convey the scope of the present disclosure to those skilled in the art.

As used herein, the term "comprising" and variations thereof represent openness, i.e., "including but not limited to". Unless specifically stated, the term "or" means "and/or". The term "based on" means "based at least in part on". The terms "an example embodiment" and "an embodiment" mean "at least one example embodiment". The term "another embodiment" means "at least one further embodiment". The terms "first," "second," and the like may refer to different or identical objects.

From the current mainstream of existing and under-construction cooling systems for large and ultra-large data center, the configuration of the chilled water system in combination with multiple terminal precision air conditioners is a mainstream cooling solution, and the reasons mainly include the following several aspects. Firstly, the solution originates from a traditional commercial building, boasts a long application history, and has rich supplier candidates, making it mature, stable and low-cost, and various related standard specifications and operation and maintenance considerations are mature. Secondly, the solution has flexible compatibility and high matching performance, is suitable for majority building forms, can be matched with most data center cooling types, and takes into account power density and future technical evolution of majority Internet Technology (IT), such as room level precision air conditioners, inter-column precision air conditioners, air wall air conditioners, back plate air conditioners, overhead air conditioners, even high density cold plate liquid cooling systems, immersion liquid cooling systems, and the like. Thirdly, the solution is highly adaptable to climate condition, can be applied and promoted in geographic regions of various different climate conditions, and is capable of being designed for a matched energy-saving and natural cooling strategy based on environment. Fourthly, the solution can be designed for a wide range of indoor environment and perform strict control to meet different requirements of various IT devices.

However, unlike traditional commercial and civil buildings, for key services carried by a data center, the failure domain of such a large chilled water system (i.e., the influence range on the service once the system is damaged) is too large. For example, in accordance with a main pipeline on the system being blocked, cracked or a key unit, a valve, a pump set and the like being damaged, or a hardware failure or a software logic error occurring in a Building Automation (BA) system, a catastrophic impact can be quickly caused, directly reducing a service level of environmental availability, and indirectly influencing a service level of power and network connection availability. After a failure occurs in the chilled water system, the heat dissipation of the IT system (usually at a power of several megawatts (MW) to tens of MW) causes the IT device to rise to a temperature of 50 to 60 degrees Celsius or even higher in a short time (usually tens of seconds), thus leading to downtime of a server, interruption of a network switch, over-temperature tripping of an electrical device and the like, and even the fire sprinkler system in the room can spray erroneously due to high temperature action, resulting in a risk of permanent damage and service unavailability to a part of or all of the IT device. Therefore, it is important to design a highly reliable cooling system to prevent the occurrence of such ultra-large-scale, ultra-long delay failures.

Evaluating the reliability of the data center infrastructure mainly depends on three indicators: failure probability, failure radius and recovery time. Currently, an availability level is used internationally to describe, and the availability level represents a ratio of time of service continuity being guaranteed in a year to total time, 8760 h, of a year in a certain range of IT device. In order to improve the reliability of the data center, the conventional cooling system mainly includes the following several solutions.

A first solution is to use a non-centralized distributed system. For example, multiple sets of small granularity cooling systems, such as an air handling unit (AHU) or a direct expansion air conditioner (DX air conditioner), may be employed. Such distributed system may also include a redundant configuration. Even in a case that a single cooling system fails completely, the failure radius thereof is still small. However, the overall device and maintenance cost of the distributed system is high, excessive devices are not easy to be managed and the system reliability is low, which is generally applicable to small and medium data center applications, and application scenarios are limited.

The second solution is to use an extremely high redundancy design for the large chilled water system. For example, a 2N configuration of dual (2N) pipelines and dual cooling systems may be employed. This configuration does indeed significantly reduce the risk of system failure, but device investment thereof is too large, the installation of devices and pipelines is complex and a large space is occupied, and efficiency thereof is poor during normal operation due to low load of the cooling device, which is not conducive to energy saving and consumption reduction. Therefore, this solution is generally mainly applicable to situation of customer special requirement or special industry such as finance. In addition, in this solution, when the building automation system fails, it is still a single point of failure, which has a destructive effect on the system.

The third solution is to use fresh air cooling as a main cooling mode. This solution can simultaneously be configured with uninterruptible power supply (UPS) for emergency response. The solution includes direct fresh air cooling and indirect fresh air cooling. Although this solution balances energy saving and consumption reduction and system reliability, application range thereof is limited. Because of constraints on building structure form and requirement of IT device on environmental temperature, humidity, and cleanliness, majority regions are generally difficult to use this system in a whole year, otherwise, the reliability of the IT device will be greatly reduced, the service life is attenuated, and the service reliability is influenced. Therefore, the solution is mainly suitable for region with low environmental pollution, stable temperature and humidity climate and being cool.

In the chilled water system, air conditioner device redundancy is usually designed, for example, N+1, N+2 or even 2N redundancy, wherein the N+1 redundancy indicates a redundant setting for a single key device, the N+2 redundancy indicates a redundant setting for two key devices, and 2N indicates that a redundant setting for all devices. Failure of an individual air conditioner device may not cause a reduction of environmental availability and not affect service continuity, and failure scenarios that may cause a reduction environmental availability are as follows: an air conditioner power failure, that is, a secondary air conditioner failure caused by a power failure; an air conditioner automatic control failure, which may be caused by a control system power failure, a control system hardware/software failure, a control system logical failure; an air conditioner leakage failure, caused by a pipeline valve rupture leakage, or a leakage caused by malfunction of a valve water pump, etc.

Embodiments of the present disclosure provide an emergency cooling system independent of a main cooling system (for example, a main air conditioner system) for the above scenarios that may occur, configured to perform emergency cooling when the above failures of the main cooling system occur, and need to avoid a simultaneous failure of the main cooling system and the emergency cooling system when the above scenarios occur. The embodiments of the present disclosure utilize a large amount of exhaust air and supplementary air as an emergency cooling supply of the main cooling system to ensure that the data center cooling system operate with high reliably even in a case that the main cooling system fails or the automatic control system fails. Example embodiments of the present disclosure will be described below with reference to FIG. 1 to FIG. 7.

Figure 2:
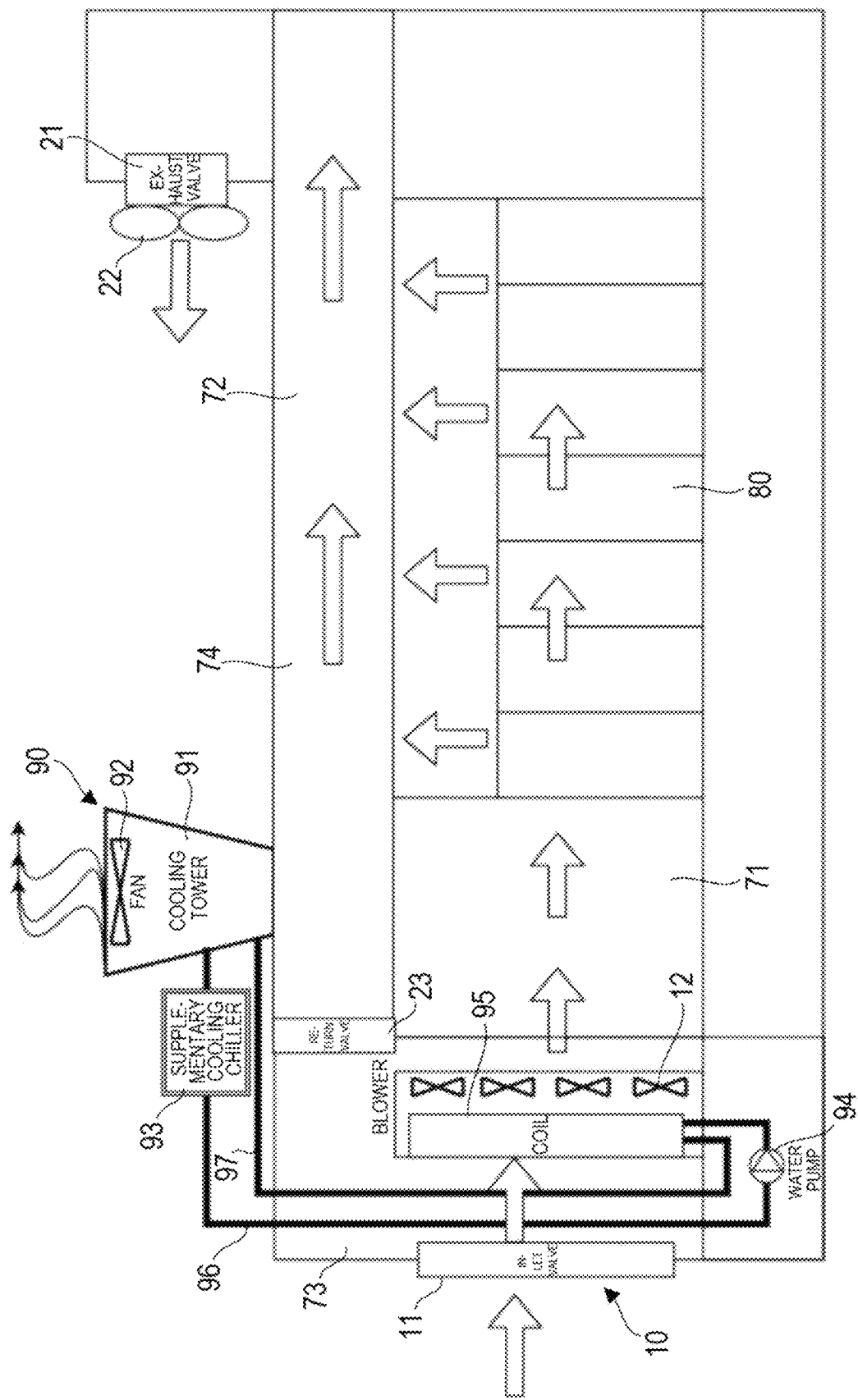
Figure 3:
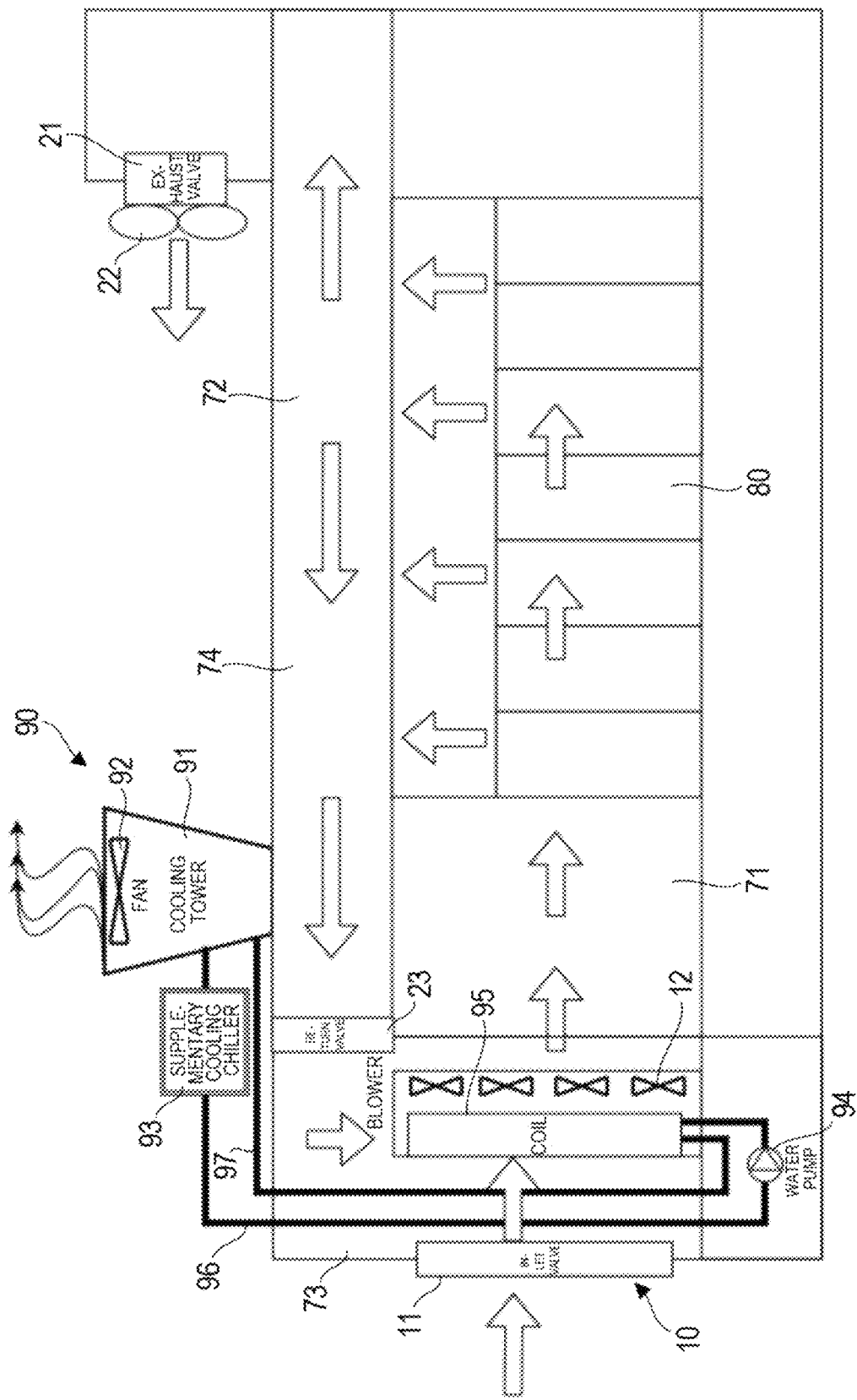

FIG. 1 to FIG. 3 show schematic structural diagrams of a data center cooling system according to one or more embodiments of the present disclosure. Different working modes of the data center cooling system are respectively shown in FIG. 1 to FIG. 3, wherein FIG. 1 shows a normal cooling supply mode of the data center cooling system, FIG. 2 shows an emergency/energy-saving working mode of the data center cooling system, and FIG. 3 shows a supplementary cooling working mode of the data center cooling system.

As shown in FIGS. 1-3, the data center cooling system described herein generally includes a main cooling system 90 and an emergency cooling system 10. The emergency cooling system 10 is powered independently of the main cooling system 90 such that the emergency cooling system 10 can still be normally powered in a case that a power failure occurs in the main cooling system 90. In some embodiments, the emergency cooling system 10 may be provided with power distribution redundancy to improve the reliability of the emergency cooling system 10. In addition, the emergency cooling system 10 may be independently controlled from the main cooling system 90 to avoid sharing control unit, so that the emergency cooling system 10 can still work normally when a control system hardware/software failure or a control system logic failure of the main cooling system 90 occurs.

In an embodiment, as shown in FIGS. 1-3, the main cooling system 90 includes a cooling tower 91, a heat exchanging device 95, and a blower 12. The cooling tower 91 may also be referred to as a cold tower, disposed outside a room (also referred to herein as a data room) of the data center for providing cooling water. A fan 92 may be provided on the cooling tower 91 for facilitating the discharge of heat from the cooling water in the cooling tower 91 to outdoors, thereby providing low-temperature cooling water. The cooling tower 91 is connected to the heat exchanging device 95 through a supply pipe 96 and a return pipe 97. The cooling tower 91 may provide low-temperature cooling water to the heat exchanging device 95 via the supply pipe 96. A supplementary cooling chiller 93 may be disposed on the supply pipe 96 for providing additional cold quantity to the low-temperature cooling water provided by the cooling tower 91, thereby further reducing the temperature of the cooling water. A water pump 94 may also be disposed on the supply pipe 96 for pumping the cooling water to the heat exchanging device 95. The heat exchanging device 95 may use the cooling water therein to cool the air in the vicinity of the heat exchanging device 95. The cooling water in the heat exchanging device 95 can be heated after absorbing heat from air, and the heated cooling water can be returned to the cooling tower 91 to be cooled again through the return pipe 97. With such circulation, the cooling tower 95 may continuously provide cooling water to the heat exchanging device 95 for cooling air in the vicinity of the heat exchanging device 95. The heat exchanging device 95 may be in the form of a coil or in other structural form, which is not limited in the embodiment of the present disclosure. The blower 12 is disposed adjacent to the heat exchanging device 95 for guiding air cooled by the heat exchanging device 95 to an electronic device 80 to be cooled. For example, the electronic device 80 may include various types of IT devices, which is not limited in the embodiment of the present disclosure.

In an embodiment, as shown in FIGS. 1-3, the emergency cooling system 10 includes an inlet valve 11, an exhaust valve 21, an exhaust fan 22, and a return valve 23. The inlet valve 11 is disposed at a fresh air region 73 of the room. The inlet valve 11 allows outdoor air to enter the fresh air region 73 in an open state, and prevents outdoor air from entering the fresh air region 73 in a closed state. The exhaust valve 21 is disposed at an exhaust region 74 of the room. The exhaust valve 21 allows air in the exhaust region 74 to be discharged outdoors in an open state, and prevents air in the exhaust region 74 from being discharged outdoors in a closed state. The exhaust fan 22 is disposed adjacent to the exhaust valve 21, and is configured to drive air in the exhaust region 74 to be discharged outdoors when the exhaust valve 21 is in the open state. The return valve 23 is disposed between the exhaust region 74 and the fresh air region 73. The return valve 23 allows air in the exhaust region 74 to enter the fresh air region 73 in an open state, and prevents air in the exhaust region 74 from entering the fresh air region 73 in a closed state.

In some embodiments, the blower 12 may be shared by the main cooling system 90 and the emergency cooling system 10. As shown in FIG. 1, in the normal cooling supply mode of the data center cooling system, the blower 12 is configured to drive the air cooled by the heat exchanging device 12 to the electronic device 80. As shown in FIG. 2, in the emergency/energy-saving working mode of the data center cooling system, the blower 12 is configured to drive fresh air entering the fresh air region 73 through the inlet valve 11 to the electronic device 80. As shown in FIG. 3, in the supplementary cooling working mode of the data center cooling system, the blower 12 is configured to drive air cooled by the heat exchanging device 12 and fresh air entering the fresh air region 73 through the inlet valve 11 to the electronic device 80. By sharing the blower 12, the overall cost of the data center cooling system can be reduced.

In some embodiments, instead of the shared blower 12, the emergency cooling system 10 may include an additional blower for driving fresh air entering the fresh air region 73 through the inlet valve 11 to the electronic device 80. In such embodiments, different blowers may be separately powered and controlled to improve system independence between the main cooling system 90 and the emergency cooling system 10.

As shown in FIG. 1, when the main cooling system 90 works normally, the inlet valve 11, the exhaust valve 21 and the exhaust fan 22 are closed, and the return valve 23 is opened. In this case, an air inner circulation path may be formed inside the data room. Specifically, the heat exchanging device 95 may use the cooling water therein to cool air in the vicinity of the heat exchanging device 95, the blower 12 may guide air cooled by the heat exchanging device 95 to the electronic device 80 to be cooled through the cold channel 71, the cooled air becomes hot air after cooling the electronic device 80, and the hot air may be guided to the heat exchanging device 95 to be cooled again through the hot channel 72 and the return valve 23. With such a circulation, an enclosed inner circulation path is formed inside the data room. The cold channel 71 is located between the fresh air region 73 and the electronic device 80 to be cooled. The hot channel 72 is located at the exhaust region 74, and may include a closed air return ceiling, and an electric valve for air supply and return and an air channel. The cold channel 71 and the hot channel 72 are isolated from each other to prevent cold air (also referred to as cooling air) from mixing with hot air (also referred to as heated air) to avoid loss of cold quantity.

However, when a failure such as a power failure, a control system hardware/software failure, or a control system logical failure of the main cooling system 90 occurs, the cooling tower 91 cannot provide enough cooling water to the heat exchanging device 95 in time, causing the electronic device 80 to rise to a temperature of 50 to 60 degrees Celsius or even higher in a short time (usually tens of seconds), which may cause problems such as downtime of a server, interruption of a network switch, over-temperature tripping of an electrical device, etc., and even the fire sprinkler system in the data room may spray erroneously due to high temperature action, resulting in a risk of permanent damage and service unavailability to a part or all of the electronic device 80.

As shown in FIG. 2, in a case that the main cooling system 90 fails, the data center cooling system may work in an emergency mode so as to prevent the temperature of the electronic device 80 from rising rapidly in a short time. In the emergency mode, the inlet valve 11, the exhaust valve 21 and the exhaust fan 22 are opened, and the return valve 23 is closed. The global extreme dry bulb temperature is about 35° C. to 40° C. or slightly higher, given that the IT device such as a server and the like can run at this temperature for a short time and maintain the continuity of the service, the embodiment of the present disclosure uses outdoor direct fresh air as an emergency cooling source when the main cooling system fails. In this way, a fresh air cooling path may be formed in the data room. Specifically, fresh air may enter the fresh air region 73 through the inlet valve 11, and the blower 12 or the additional blower as mentioned above may guide the fresh air to the electronic device 80 to be cooled. The heated fresh air can be discharged outdoors through the exhaust region 74 and the exhaust valve 21 under the driving of the exhaust fan 22 without being returned to the fresh region 73 through the return valve 23. In this way, it can be ensured that the electronic device 80 in the data room can still operate reliably when the main cooling system 90 fails.

In some embodiments, in a case that the outdoor climate condition is good, the main cooling system 90 may be stopped to operate, and the electronic device 80 can be cooled entirely by the emergency cooling system 10. At this time, the data center cooling system may work in an energy-saving mode. As shown in FIG. 2, in the energy-saving mode, the inlet valve 11, the exhaust valve 21 and the exhaust fan 22 are opened, and the return valve 23 is closed. In this way, a fresh air cooling path may be formed in the data room. Specifically, fresh air may enter the fresh air region 73 through the inlet valve 11, and the blower 12, or the additional blower as mentioned above may guide fresh air to the electronic device 80 to be cooled. The heated fresh air can be discharged outdoors through the exhaust region 74 and the exhaust valve 21 under the driving of the exhaust fan 22 without being returned to the fresh air region 73 through the return valve 23. In this way, it can be ensured that the electronic device 80 in the data room can still operate reliably in a case that only the emergency cooling system 10 is used, thus realizing energy saving and consumption reduction, optimizing power utilization efficiency (PUE), and improving social benefit.

As shown in FIG. 3, in a case that the outdoor climate condition is good, instead of the energy-saving mode in which only the emergency cooling system 10 operates, the main cooling system 90 and the emergency cooling system 10 can operate simultaneously so as to allow the emergency cooling system 10 to supply cooling to the main cooling system 90, and thus the data center cooling system works in a supplementary cooling mode. In the supplementary cooling mode, the inlet valve 11, the exhaust valve 21, the exhaust fan 22 and the return valve 23 are all opened. In this way, the main cooling system 90 may be supplemented with cooling by additional cold quantity provided by fresh air. Specifically, fresh air may enter the fresh air region 73 through the inlet valve 11, and mix with the hot air returned from the exhaust region 74 through the return valve 23 in the fresh air region 73. The mixed air may be cooled by the heat exchanging device 95, and the blower 12 may drive the cooled air to the electronic device 80. The temperature of the air increases after passing through the electronic device 80. A part of the heated air may be discharged outdoors through the exhaust region 74 and the exhaust valve 21 under the driving of the exhaust fan 22, and the other part may be returned to the fresh region 73 through the return valve 23 to mix with fresh air again. By utilizing the supplementary cooling mode, energy saving and consumption reduction and optimization of power usage efficiency can also be achieved.

Figure 4:
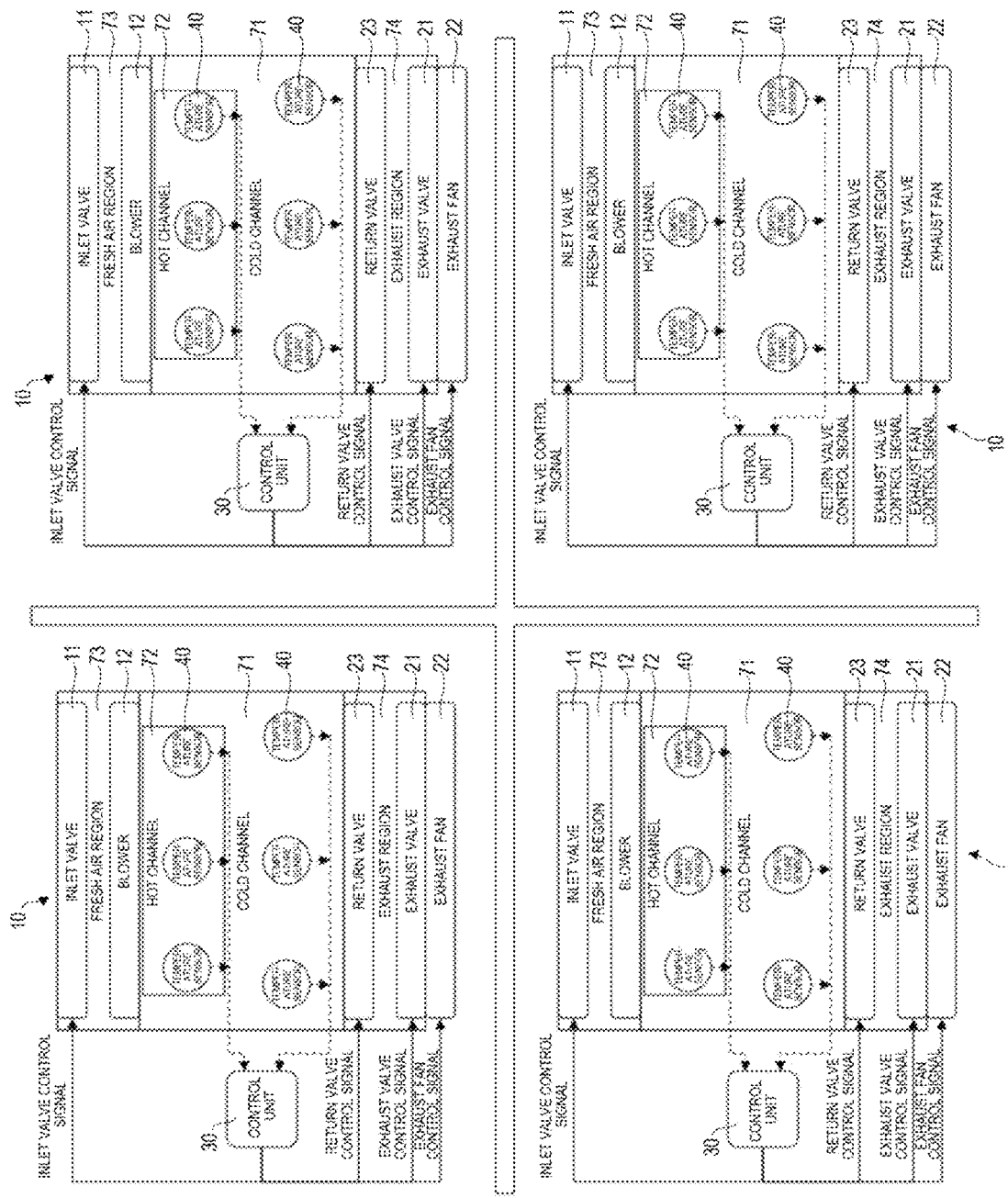
FIG. 4 shows a partition controlling solution of a room according to one or more embodiments of the present disclosure.

FIG. 4 shows a partition controlling solution of a room according to one or more embodiments of the present disclosure. As shown in FIG. 4, the emergency cooling system 10 may be arranged using a room as unit, that is, a separate emergency cooling system 10 is provided for each room. Four sets of emergency cooling systems 10 are shown in FIG. 4 as examples to illustrate the principles of the present disclosure, corresponding to four different rooms, respectively. With such an arrangement, a corresponding emergency cooling system 10 may be individually started for each room without affecting the operation of cooling systems of other rooms. For example, when the main cooling system 90 in a certain room fails, it is possible to start only the emergency cooling system 10 in the room, without starting the emergency cooling system 10 in other rooms.

The control solution of each set of emergency cooling systems 10 will be described below in conjunction with FIG. 4 on the basis of FIGS. 1-3. As shown in FIG. 4, the emergency cooling system 10 includes the inlet valve 11, the blower 12, the return valve 23, the exhaust valve 21, and the exhaust fan 22 as described above. It should be understood that FIG. 4 is primarily used to show the control solution of the emergency cooling system 10 and is not intended to show the specific arrangement of the various components. For specific arrangements of the various components, reference may be made to the embodiments described in conjunction with FIG. 1 to FIG. 3.

As shown in FIG. 4, in order to achieve control of the emergency cooling system 10, the emergency cooling system 10 further includes a temperature sensor 40 and a control unit 30. The temperature sensor 40 is configured to detect an indoor temperature of the room. The control unit 30 may receive the indoor temperature detected by the temperature sensor 40 and control the state of the inlet valve 11, the return valve 23, the exhaust valve 21, and the exhaust fan 22 based on the detected indoor temperature. For example, the control unit 30 may generate an inlet valve control signal based on the indoor temperature detected by the temperature sensor 40 for controlling the inlet valve 11 to be opened or closed. The control unit 30 may generate a return valve control signal based on the indoor temperature detected by the temperature sensor 40 for controlling the return valve 23 to be opened or closed. The control unit 30 may generate an exhaust valve control signal based on the indoor temperature detected by the temperature sensor 40 for controlling the exhaust valve 21 to be opened or closed. The control unit 30 may generate an exhaust fan control signal based on the indoor temperature detected by the temperature sensor 40 for controlling the exhaust fan 22 to be turned on or off.

In embodiments according to the present disclosure, the inlet valve, the exhaust valve, the exhaust fan and the return valve are disposed in the room, and the control unit is provided to control the states of the inlet valve, the exhaust valve, the exhaust fan, and the return valve, so that when the indoor temperature of the room exceeds the predetermined temperature threshold, the inlet valve, the exhaust valve and the exhaust fan can be opened, and the return valve can be closed. In this way, when the temperature in the room is increased due to a failure of the main cooling system, the fresh air can be guided into the fresh air region through the inlet valve for emergency cooling of the electronic device, and the heated fresh air can be discharged outdoors through the exhaust valve under the driving of the exhaust fan without being returned to the fresh air region through the return valve, thereby ensuring that the electronic device in the room can still operate reliably in a case that the main cooling system fails. The specific control logic of the control unit 30 will be described in detail below in conjunction with FIG. 5 and FIG. 6.

In some embodiments, as shown in FIG. 4, Both the hot channel 72 and the cold channel 71 of the room are provided with the temperature sensor 40 for detecting the temperature of both the hot channel 72 and the cold channel 71 as the indoor temperature of the room. In other embodiments, the temperature sensor 40 may be disposed only in one of the hot channel 72 and the cold channel 71 of the room to detect the temperature of the hot channel 72 or the cold channel 71 as the indoor temperature of the room. The embodiment of the present disclosure do not impose strict limitations on the arrangement position of the temperature sensor 40, as long as the indoor temperature of the room can be reflected.

As described above, the control unit 30 may generate various control signals based on the indoor temperature detected by the temperature sensor 40 to control the state of the corresponding component. Example control logic of the control unit 30 will be described below in conjunction with FIGS. 5 and 6.

Figure 5:
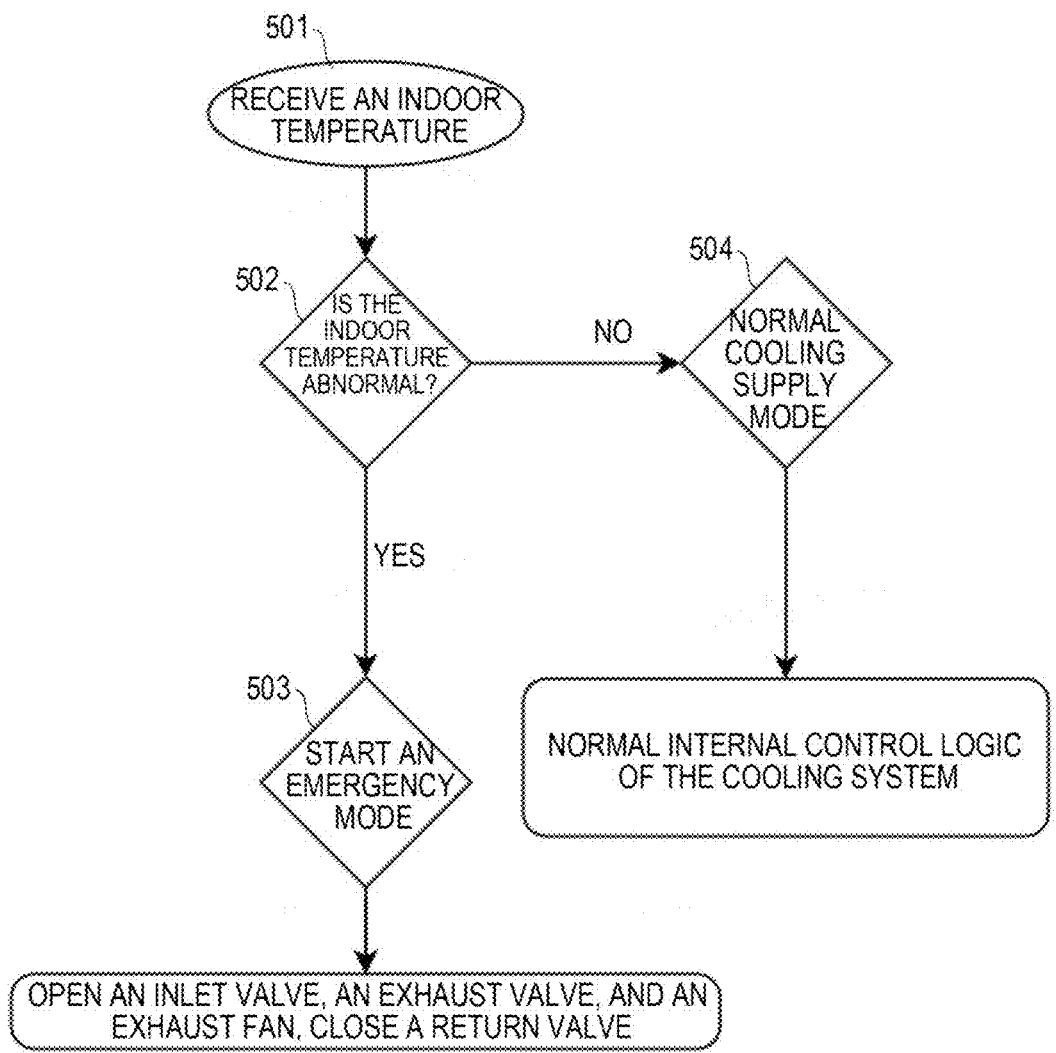
FIG. 5 shows a flowchart of an emergency cooling method for a data center according to one or more embodiments of the present disclosure.

FIG. 5 shows a flowchart of an emergency cooling method for a data center according to one or more embodiments of the present disclosure. As shown in FIG. 5, at block 501, the control unit 30 receives the indoor temperature detected by the temperature sensor 40. At block 502, the control unit 30 compares the received indoor temperature with a predetermined temperature threshold to determine whether the indoor temperature is abnormal. In accordance with a determination that the indoor temperature exceeds the predetermined temperature threshold (i.e., the indoor temperature is abnormal) at block 502, the control unit 30 will start the emergency mode of the data center cooling system at block 503. In the emergency mode, the control unit 30 controls the inlet valve 11, the exhaust valve 21, and the exhaust fan 22 to be opened, and controls the return valve 23 to be closed by the corresponding control signal shown in FIG. 4. In this way, the emergency mode of the data center cooling system can be quickly and automatically started based on the temperature signal provided by the temperature sensor 40, reducing the recovery time of a thermal event of the room. In accordance with a determination that the indoor temperature does not exceed the predetermined temperature threshold (i.e., the indoor temperature is not abnormality) at block 502, the control unit 30 will start a normal cooling supply mode of the data center cooling system at block 504. In the normal cooling supply mode, the control unit 30 controls the inlet valve 11, the exhaust valve 21 and the exhaust fan 22 to be closed, and controls the return valve 23 to be opened by the corresponding control signal shown in FIG. 4, so that the data center cooling system operates with normal internal control logic of the cooling system. Operation of the data center cooling system in the normal cooling supply mode and the emergency mode has been described in detail above in conjunction with FIG. 1 and FIG. 2, and details are not described herein again.

It should be understood that the indoor temperature of the room is merely an example manner for determining whether to start the emergency mode of the data center cooling system, and in other embodiments, whether to start the emergency mode of the data center cooling system may be determined based on other indoor environmental conditions of the room. For example, in some embodiments, in addition to the indoor temperature of the room, the control unit 30 may further determine whether to start the emergency mode of the data center cooling system based on pressure of the room. For example, a pressure sensor (not shown) may be disposed in the room to detect indoor pressure of the room. The control unit 30 may further receive the indoor pressure detected by the pressure sensor at block 501, and compare the received indoor temperature with the predetermined temperature threshold at block 502 and compare the received indoor pressure with a predetermined pressure threshold. In accordance with a determination that the received indoor temperature exceeds the predetermined temperature threshold and the received indoor pressure exceeds the predetermined pressure threshold, the control unit 30 starts the emergency mode of the data center cooling system at 503, controls the inlet valve 11, the exhaust valve 21, and the exhaust fan 22 to be closed, and controls the return valve 23 to be opened by the corresponding control signal.

Figure 6:
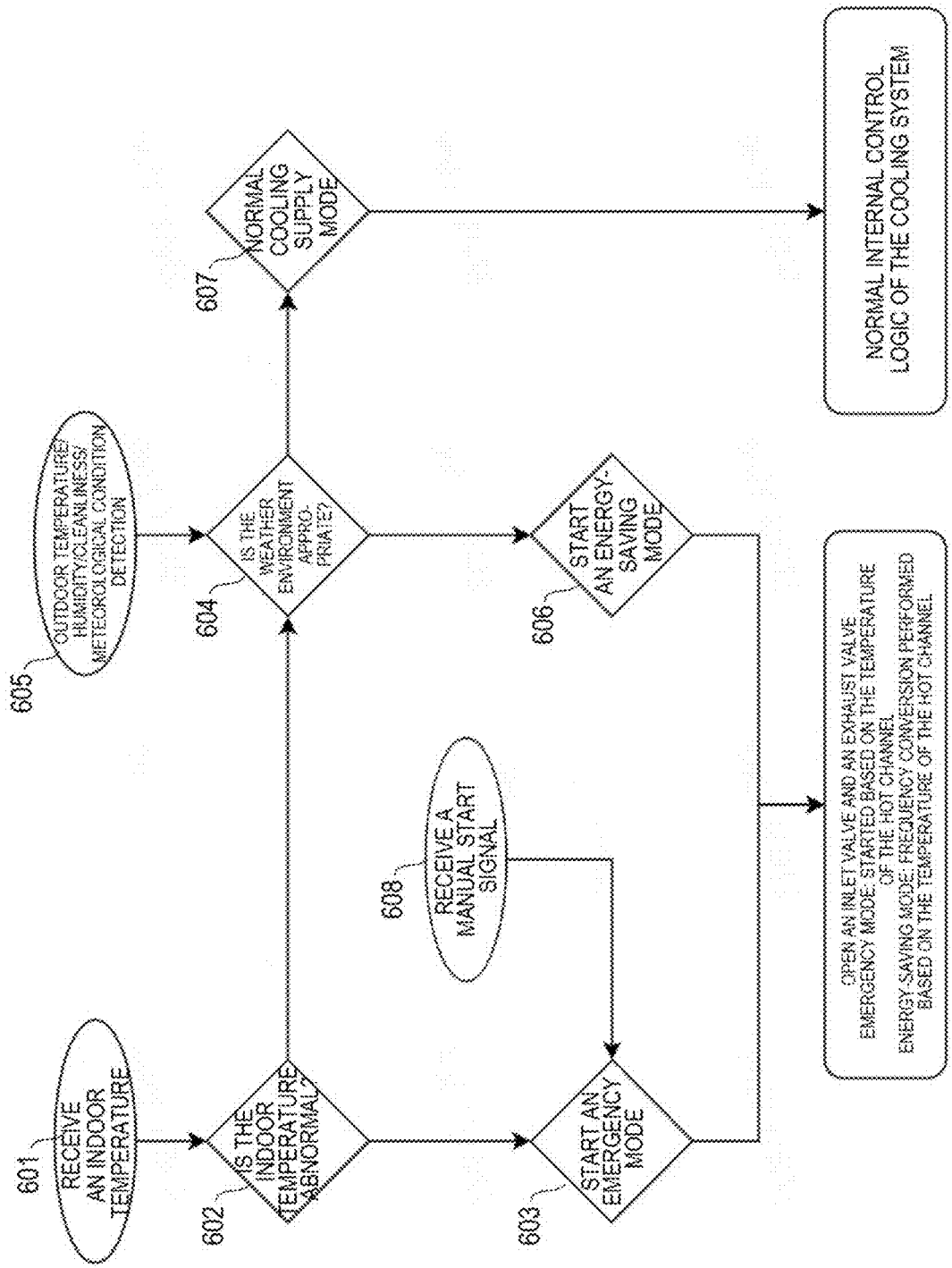
FIG. 6 shows a flowchart of an emergency cooling method for a data center according to one or more embodiments of the present disclosure.

FIG. 6 shows a flowchart of an emergency cooling method for a data center according to one or more embodiments of the present disclosure.

As shown in FIG. 6, at block 601, the control unit 30 receives the indoor temperature detected by the temperature sensor 40. As described above, the temperature sensor 40 may detect a temperature of at least one of the hot channel 72 and the cold channel 71 as the indoor temperature of the room.

At block 602, the control unit 30 compares the received indoor temperature with the predetermined temperature threshold to determine whether the indoor temperature is abnormal. In accordance with a determination that the indoor temperature exceeds the predetermined temperature threshold (i.e., the indoor temperature is abnormal) at block 602, the control unit 30 will start the emergency mode of the data center cooling system at block 603. In the emergency mode, the control unit 30 controls the inlet valve 11, the exhaust valve 21, and the exhaust fan 22 to be opened, and controls the return valve 23 to be closed by the corresponding control signal shown in FIG. 4. In this way, it is possible to reliably start the emergency mode based on the indoor temperature of the room (such as the temperature of at least one of the hot channel 72 and the cold channel 71).

As described above, in addition to the indoor temperature of the room, the control unit 30 may further determine whether to start the emergency mode of the data center cooling system based on the pressure of the room. In such embodiment, as shown in FIG. 6, the control unit 30 may further receive the indoor pressure detected by the pressure sensor at block 601 and compare the received indoor temperature with the predetermined temperature threshold at block 602 and compare the received indoor pressure with the predetermined pressure threshold. In accordance with the received indoor temperature exceeding the predetermined temperature threshold and the received indoor pressure exceeding the predetermined pressure threshold, the control unit 30 starts the emergency mode of the data center cooling system at block 603, thereby controlling the inlet valve 11, the exhaust valve 21, and the exhaust fan 22 to be closed, and controlling the return valve 23 to be opened by the corresponding control signal.

As shown in FIG. 6, in accordance with a determination that the indoor temperature of the room does not exceed the predetermined temperature threshold (i.e., the indoor temperature is not abnormal) at block 602, the control unit 30 will perform the operations at block 604. At block 604, the control unit 30 determines whether the outdoor environmental condition received at block 605 satisfies a predetermined criteria to determine whether the outdoor weather environment is appropriate. In an embodiment, the outdoor environmental condition may include at least one of temperature, humidity, air cleanliness, or meteorological condition. In other embodiments, the outdoor environmental condition may further include other items, which is not limited in the embodiments of the present disclosure.

In accordance with a determination that the outdoor environmental condition satisfies the predetermined criteria at block 604, the control unit 30 may start the energy-saving mode of the data center cooling system at block 606, thereby controlling the inlet valve 11, the exhaust valve 21, and the exhaust fan 22 to be opened, and controlling the return valve 23 to be closed by the corresponding control signal. In this way, a fresh air cooling path may be formed in the room. The operation principle of the data center cooling system in the energy-saving mode may refer to the content described above in conjunction with FIG. 2, and details are not described herein again.

In some embodiments, in the energy-saving mode of the data center cooling system, the control unit 30 may perform frequency conversion on the blower 12 based on the indoor temperature of the room (for example, the temperature of at least one of the hot channel 72 and the cold channel 71) to dynamically adjust amount of fresh air.

In some embodiments, in accordance with a determination that the outdoor environmental condition satisfies the predetermined criteria at block 604, the control unit 30 may control the inlet valve 11, the exhaust valve 21, the exhaust fan 22, and the return valve 23 to be opened by the corresponding control signal, so as to start the supplementary cooling mode of the data center cooling system. In this way, the main cooling system 90 may be supplemented cooling with additional cold quantity provided by fresh air. The operation principle of the data center cooling system in the supplementary cooling mode may be referred to the content described above in conjunction with FIG. 3, and details are not described herein again.

In accordance with a determination that the outdoor environmental condition does not satisfy the predetermined criteria at block 604, the control unit 30 starts a normal cooling supply mode of the data center cooling system at block 607. In the normal cooling supply mode, the control unit 30 controls the inlet valve 11, the exhaust valve 21 and the exhaust fan 22 to be closed, and controls the return valve 23 to be opened by the corresponding control signal shown in FIG. 4, so that the data center cooling system operates with the normal internal control logic of the cooling system. Operation of the data center cooling system in the normal cooling supply mode may refer to the content described above in conjunction with FIG. 1, and details are not described herein again.

In some embodiments, the emergency cooling system 10 may further include a manual start unit configured to generate a start signal for starting the emergency cooling system upon being triggered by a user. As shown in FIG. 6, the control unit 30 may receive the start signal from the manual start unit at block 608 and start the emergency mode in response to receiving the start signal. The operation principle of the data center cooling system in the emergency mode may refer to the content described above in conjunction with FIG. 2, and details are not described herein again. In such embodiment, the emergency mode of the emergency cooling system may be manually started by personnel even in a case that the automatic control function of the emergency cooling system 10 fails.

In some embodiments, the emergency cooling system 10 further includes a humidifying and dehumidifying unit disposed in the room for adjusting the humidity of air in the room. With such an arrangement, the application range of the emergency cooling system 10 can be broadened.

In some embodiments, the emergency cooling system 10 further includes an air preprocessing unit disposed before the inlet valve 11 for preprocessing outdoor air entering the fresh air region 73.

In some embodiments, the emergency cooling system 10 may also take fire protection smoke exhaust and air supplementing systems into account, improve system reliability, and reduce system initial investment of the system.

The emergency cooling system 10 according to an embodiment of the present disclosure has low cost and does not significantly affect the construction cost of the data center.

The startup and control logic of the emergency cooling system 10 according to an embodiment of the present disclosure is simple, which can avoid a derivative failure due to high complexity of the control system.

The emergency cooling system 10 according to embodiments of the present disclosure has high compatibility, and may be applicable to various types of main cooling systems 90, such as centralized chilled water systems, distributed systems, cold plate liquid cooling systems, and the like.

The emergency cooling system 10 according to an embodiment of the present disclosure does not add difficulty to the construction cost of the data center infrastructure, and some devices of the emergency cooling system 10 may borrow devices of the main cooling system 90, such as the blower 12 described above.

Figure 7:
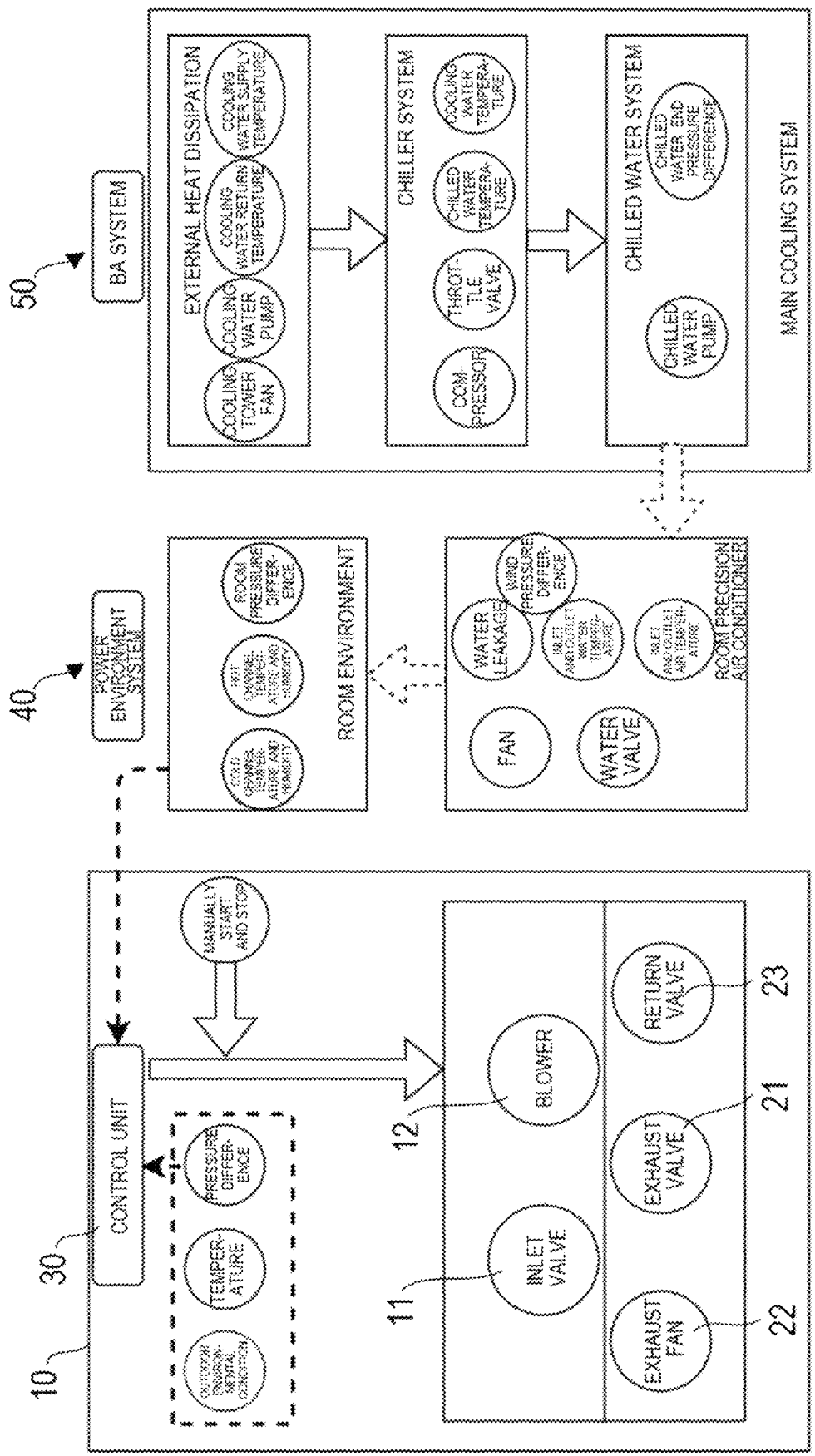
FIG. 7 shows a linkage control solution according to one or more embodiments of the present disclosure.

The emergency cooling system 10 according to embodiments of the present disclosure may be linkage controlled with a power environment monitoring system (also referred to as a power environment system or a power environmental system for short) of the data center and a building automation system (also referred to as a BA system for short). FIG. 7 shows a linkage control solution according to one or more embodiments of the present disclosure. As shown in FIG. 7, the emergency cooling system 10 includes a configuration as described above in conjunction with FIGS. 1-4, and may perform the emergency cooling method as described above in conjunction with FIGS. 5 and 6. For example, the control unit 30 may control the state of the inlet valve 11, the blower 12, the exhaust valve 21, the exhaust fan 22, and the return valve 23 based on at least one of the indoor temperature, the indoor pressure (or pressure difference), and the outdoor environmental condition, such that the data center cooling system is in the normal cooling supply mode, the emergency mode, the energy-saving mode, or the supplementary cooling mode as described above. The indoor temperature and indoor pressure required by the control unit 30 may be provided by the power environment monitoring system 40. The power environment monitoring system 40 may provide the temperature and humidity of the cold channel, the temperature and humidity of the hot channel, and the room pressure difference in the room environment to the control unit 30. In addition, the control unit 30 may also be started and stopped by manually control of a user.

The power environment monitoring system 40 is used for monitoring a communication power supply and the room environment, and is a computer control system that carries out telemetering, remote signaling, remote regulating, and remote control of a variety of power devices such as power cabinets, UPS, air conditioners, storage batteries and the like distributed in each room, as well as various parameters of room environment such as door magnetism, infrared, window breakage, water immersion, temperature and humidity, smoke sensing and the like, monitors operation parameters thereof in real time, diagnoses and processes failures, records and analyzes related data, and performs centralized monitoring and centralized maintenance of the devices.

A room precision air conditioner is a special air conditioner designed for a modern electronic device room, and working accuracy and reliability thereof are much higher than those of a common air conditioner.

The BA system 50 is an automatic control system, using a microcomputer as a center, connecting regional controllers distributed on a monitoring site by a network conforming to an industry standard, achieving a centralized monitor and management of the chilled water system of a building through a specific terminal device. The BA system 50 may be the main cooling system 90 as described above.

The BA system 50 includes an external heat dissipation system including a cooling tower (also referred to as a cooling tower fan) and a cooling water pump. The cooling tower is a device that uses water as a circulating coolant, absorbing heat from a system and discharging it to the atmosphere for reducing the water temperature; it is an evaporative heat dissipation device, utilizing flow contact between the water and air to perform cold and heat exchange to generate steam, the steam volatilizes to take away heat based on principles such as evaporation heat dissipation, convective heat transfer and radiation heat transfer and to the like to dissipate the waste heat generated in the industrial or cooling air conditioner to reduce the temperature of the water, so that the normal operation of the system is ensured, the device is generally in a barrel-shaped, and therefore it is named as a cooling tower. The cooling water pump is a cooling water circulation device used to pressurize and convey cooling water, to ensure the operation of the system and the continuous supply of the cooling water.

The BA system 50 also includes a chiller system, which is also referred to as a freezer, chiller unit, water chiller, cooling device, etc. The cooling effect is achieved through a compressor, an evaporator, a condenser, an expansion valve, and a throttle valve. The compressor is a kind of slave fluid machinery that raises low-pressure gas into high-pressure gas, and is one of the four major components of the cooling system. The throttle valve is a valve that controls fluid flow by changing a throttling cross-section or a throttling length, and is one of the four major components of a cooling system.

The BA system 50 also includes a chilled water system that includes a chilled water pump. The chilled water pump is a chilled water circulation system used to pressurize and convey chilled water, and ensure operation of the system and continuous supply of the chilled water.

The emergency cooling system 10 according to the embodiments of the present disclosure can have an emergency cooling effect on various main cooling systems 90 (for example, a chilled water system, a direct-expansion air conditioner and a cold plate liquid cooling) in mass utilization, allowing rapid recovery from the thermal event of the data center, and can cancel the cooling tower and the chilled water UPS system under some conditions, thereby simplifying the system architecture and reducing the cost.

The emergency cooling system 10 according to an embodiment of the present disclosure has high environmental adaptability in a global larger range, and can share a part of fresh air cooling in a transition season, thereby saving energy and reducing consumption. It can take on the load of the IT device during operational spikes of the IT device, improving overall IT production and resource utilization rate.

the emergency cooling system 10 according to an embodiment of the present disclosure is designed to be decoupled from the main cooling system 90, with simple and independent control and low cost, and can also be applicable to the retrofit project.

Embodiments of the present disclosure may also be embodied in the following clauses:

Clause 1. An emergency cooling system for a data center, including: a temperature sensor configured to detect an indoor temperature of a room of the data center; an inlet valve disposed at a fresh air region of the room, the inlet valve allowing outdoor air to enter the fresh air region in an open state, and preventing outdoor air from entering the fresh air region in a closed state; an exhaust valve disposed at an exhaust region of the room, the exhaust valve allowing air in the exhaust region to be discharged outdoors in an open state, and preventing air in the exhaust region from being discharged outdoors in a closed state; an exhaust fan disposed adjacent to the exhaust valve, to drive air in the exhaust region to be discharged outdoors when the exhaust valve is in the open state; a return valve disposed between the exhaust region and the fresh air region, the return valve allowing air in the exhaust region to enter the fresh air region in an open state, and preventing air in the exhaust region from entering the fresh air region in a closed state; and a control unit configured to: receive the indoor temperature detected by the temperature sensor; compare the indoor temperature with a predetermined temperature threshold; and in response to the indoor temperature exceeding the predetermined temperature threshold, open the inlet valve, the exhaust valve, and the exhaust fan, and close the return valve.

Clause 2. The emergency cooling system of clause 1, wherein the temperature sensor is disposed in at least one of a hot channel and a cold channel of the room, the hot channel is located at the exhaust region, the cold channel is located between the fresh air region and an electronic device to be cooled.

Clause 3. The emergency cooling system of clause 1, wherein the control unit is further configured to: in response to the indoor temperature not exceeding the predetermined temperature threshold, close the inlet valve, the exhaust valve, and the exhaust fan, and open the return valve.

Clause 4. The emergency cooling system of clause 1, further including a pressure sensor configured to detect an indoor pressure of the room, wherein the control unit is further configured to: receive the indoor pressure detected by the pressure sensor; compare the indoor pressure with a predetermined pressure threshold; and in response to the indoor temperature exceeding the predetermined temperature threshold and the indoor pressure exceeding the predetermined pressure threshold, open the inlet valve, the exhaust valve, and the exhaust fan, and close the return valve.

Clause 5. The emergency cooling system of clause 1, further including a manual start unit configured to generate a start signal for starting the emergency cooling system upon being triggered by a user, wherein the control unit is further configured to: receive the start signal from the manual start unit; and in response to the start signal, open the inlet valve, the exhaust valve, and the exhaust fan, and close the return valve.

Clause 6. The emergency cooling system of clause 1, wherein the control unit is further configured to: in response to the indoor temperature not exceeding the predetermined temperature threshold, determine whether an outdoor environmental condition satisfies a predetermined criteria; and in response to the outdoor environmental condition satisfying the predetermined criteria, open the inlet valve, the exhaust valve, and the exhaust fan.

Clause 7. The emergency cooling system of clause 6, wherein the outdoor environmental condition includes at least one of temperature, humidity, air cleanliness, or meteorological condition.

Clause 8. The emergency cooling system of clause 6, wherein the control unit is further configured to: in response to the outdoor environmental condition not satisfying the predetermined criteria, close the inlet valve, the exhaust valve, and the exhaust fan, and open the return valve.

Clause 9. The emergency cooling system of clause 1, further including a humidifying and dehumidifying unit disposed in the room for adjusting the humidity of air in the room.

Clause 10. The emergency cooling system of clause 1, further including an air preprocessing unit disposed before the inlet valve for preprocessing outdoor air entering the fresh air region.

Clause 11. An emergency cooling method for a data center, including: receiving an indoor temperature of a room of the data center detected by a temperature sensor; comparing the indoor temperature with a predetermined temperature threshold; and in response to the indoor temperature exceeding the predetermined temperature threshold, opening an inlet valve, an exhaust valve, and an exhaust fan, and closing a return valve, wherein the inlet valve is disposed at a fresh air region of the room, the inlet valve allows outdoor air to enter the fresh air region in an open state, and prevents outdoor air from entering the fresh air region in a closed state, wherein the exhaust valve is disposed at an exhaust region of the room, the exhaust valve allows air in the exhaust region to be discharged outdoors in an open state, and prevents air in the exhaust region from being discharged outdoors in a closed state, wherein the exhaust fan is disposed adjacent to the exhaust valve, to drive air in the exhaust region to be discharged outdoors when the exhaust valve is in the open state, and wherein the return valve is disposed between the exhaust region and the fresh air region, the return valve allows air in the exhaust region to enter the fresh air region in an open state, and prevents air in the exhaust region from entering the fresh air region in a closed state.

Clause 12. The emergency cooling method of clause 11, further including: in response to the indoor temperature not exceeding the predetermined temperature threshold, closing the inlet valve, the exhaust valve, and the exhaust fan, and opening the return valve.

Clause 13. The emergency cooling method of clause 11, further including: in response to the indoor temperature not exceeding the predetermined temperature threshold, determining whether an outdoor environmental condition satisfies a predetermined criteria; and in response to the outdoor environmental condition satisfying the predetermined criteria, opening the inlet valve, the exhaust valve, and the exhaust fan.

Clause 14. The emergency cooling method of clause 13, further including: in response to the outdoor environmental condition not satisfying the predetermined criteria, closing the inlet valve, the exhaust valve, and the exhaust fan, and opening the return valve.

Clause 15. A data center cooling system, including: the emergency cooling system of any of clauses 1 to 10; and a main cooling system including a cooling tower, a heat exchanging device, and a blower, the cooling tower being disposed outside the room and connected to the heat exchanging device through a supply pipe and a return pipe, the heat exchanging device being disposed in the fresh air region to cool air in the fresh air region, and the blower being disposed in the fresh air region to guide air cooled by the heat exchanging device to an electronic device to be cooled.

Various embodiments of the present disclosure have been described above, which are illustrative, not exhaustive, and are not limited to the embodiments disclosed. Many modifications and variations will be apparent to those of ordinary skill in the art without departing from the scope and spirit of the illustrated embodiments. The selection of the terms used herein is intended to best explain the principles of the embodiments, practical applications, or technical improvements in the marketplace, or to enable others of ordinary skill in the art to understand the embodiments disclosed herein.

We claim:

1. An emergency cooling system for a data center, comprising:
   a temperature sensor configured to detect an indoor temperature of a room of the data center;
   an inlet valve disposed at a fresh air region of the room, the inlet valve allowing outdoor air to enter the fresh air region in an open state, and preventing outdoor air from entering the fresh air region in a closed state;
   an exhaust valve disposed at an exhaust region of the room, the exhaust valve allowing air in the exhaust region to be discharged outdoors in an open state, and preventing air in the exhaust region from being discharged outdoors in a closed state;
   an exhaust fan disposed adjacent to the exhaust valve, to drive air in the exhaust region to be discharged outdoors when the exhaust valve is in the open state;
   a return valve disposed between the exhaust region and the fresh air region, the return valve allowing air in the exhaust region to enter the fresh air region in an open state, and preventing air in the exhaust region from entering the fresh air region in a closed state; and
   a control unit configured to: receive the indoor temperature detected by the temperature sensor; compare the indoor temperature with a predetermined temperature threshold; and in response to the indoor temperature exceeding the predetermined temperature threshold, open the inlet valve, the exhaust valve, and the exhaust fan, and close the return valve.

2. The emergency cooling system of claim 1, wherein the temperature sensor is disposed in at least one of a hot channel and a cold channel of the room, the hot channel is located at the exhaust region, and the cold channel is located between the fresh air region and an electronic device to be cooled.

3. The emergency cooling system of claim 1, wherein the control unit is further configured to: in response to the indoor temperature not exceeding the predetermined temperature threshold, close the inlet valve, the exhaust valve, and the exhaust fan, and open the return valve.

4. The emergency cooling system of claim 1, further comprising a pressure sensor configured to detect an indoor pressure of the room,
   wherein the control unit is further configured to: receive the indoor pressure detected by the pressure sensor; compare the indoor pressure with a predetermined pressure threshold; and in response to the indoor temperature exceeding the predetermined temperature threshold and the indoor pressure exceeding the predetermined pressure threshold, open the inlet valve, the exhaust valve, and the exhaust fan, and close the return valve.

5. The emergency cooling system of claim 1, further comprising a manual start unit configured to generate a start signal for starting the emergency cooling system upon being triggered by a user,
   wherein the control unit is further configured to: receive the start signal from the manual start unit; and in response to the start signal, open the inlet valve, the exhaust valve, and the exhaust fan, and close the return valve.

6. The emergency cooling system of claim 1, wherein the control unit is further configured to:
   in response to the indoor temperature not exceeding the predetermined temperature threshold, determine whether an outdoor environmental condition satisfies a predetermined criteria; and
   in response to the outdoor environmental condition satisfying the predetermined criteria, open the inlet valve, the exhaust valve, and the exhaust fan.

7. The emergency cooling system of claim 6, wherein the outdoor environmental condition comprises at least one of temperature, humidity, air cleanliness, or meteorological condition.

8. The emergency cooling system of claim 6, wherein the control unit is further configured to:
   in response to the outdoor environmental condition not satisfying the predetermined criteria, close the inlet valve, the exhaust valve, and the exhaust fan, and open the return valve.

9. The emergency cooling system of claim 1, further comprising a humidifying and dehumidifying unit disposed in the room for adjusting a humidity of air in the room.

10. The emergency cooling system of claim 1, further comprising an air preprocessing unit disposed before the inlet valve for preprocessing outdoor air entering the fresh air region.

11. An emergency cooling method for a data center, comprising:
    receiving an indoor temperature of a room of the data center detected by a temperature sensor;
    comparing the indoor temperature with a predetermined temperature threshold; and
    in response to the indoor temperature exceeding the predetermined temperature threshold, opening an inlet valve, an exhaust valve, and an exhaust fan, and closing a return valve,
    wherein the inlet valve is disposed at a fresh air region of the room, the inlet valve allows outdoor air to enter the fresh air region in an open state, and prevents outdoor air from entering the fresh air region in a closed state,
    wherein the exhaust valve is disposed at an exhaust region of the room, the exhaust valve allows air in the exhaust region to be discharged outdoors in an open state, and prevents air in the exhaust region from being discharged outdoors in a closed state,
    wherein the exhaust fan is disposed adjacent to the exhaust valve, to drive air in the exhaust region to be discharged outdoors when the exhaust valve is in the open state, and
    wherein the return valve is disposed between the exhaust region and the fresh air region, the return valve allows air in the exhaust region to enter the fresh air region in an open state, and prevents air in the exhaust region from entering the fresh air region in a closed state.

12. The emergency cooling method of claim 11, further comprising:
    in response to the indoor temperature not exceeding the predetermined temperature threshold, closing the inlet valve, the exhaust valve, and the exhaust fan, and opening the return valve.

13. The emergency cooling method of claim 11, further comprising:
    in response to the indoor temperature not exceeding the predetermined temperature threshold, determining whether an outdoor environmental condition satisfies a predetermined criteria; and in response to the outdoor environmental condition satisfying the predetermined criteria, opening the inlet valve, the exhaust valve, and the exhaust fan.

14. The emergency cooling method of claim 13, further comprising:
in response to the outdoor environmental condition not satisfying the predetermined criteria, closing the inlet valve, the exhaust valve, and the exhaust fan, and opening the return valve.

15. The emergency cooling method of claim 11, wherein the temperature sensor is disposed in at least one of a hot channel and a cold channel of the room, the hot channel is located at the exhaust region, and the cold channel is located between the fresh air region and an electronic device to be cooled.

16. The emergency cooling method of claim 11, further comprising:
receiving an indoor pressure of the room detected by a pressure sensor;
comparing the indoor pressure with a predetermined pressure threshold; and
in response to the indoor temperature exceeding the predetermined temperature threshold and the indoor pressure exceeding the predetermined pressure threshold, opening the inlet valve, the exhaust valve, and the exhaust fan, and closing the return valve.

17. The emergency cooling method of claim 11, further comprising:
receiving a start signal from a manual start unit; and
in response to the start signal, opening the inlet valve, the exhaust valve, and the exhaust fan, and closing the return valve.

18. A data center cooling system, comprising:
an emergency cooling system for a data center, comprising:
a temperature sensor configured to detect an indoor temperature of a room of the data center;
an inlet valve disposed at a fresh air region of the room, the inlet valve allowing outdoor air to enter the fresh air region in an open state, and preventing outdoor air from entering the fresh air region in a closed state;
an exhaust valve disposed at an exhaust region of the room, the exhaust valve allowing air in the exhaust region to be discharged outdoors in an open state, and preventing air in the exhaust region from being discharged outdoors in a closed state;
an exhaust fan disposed adjacent to the exhaust valve, to drive air in the exhaust region to be discharged outdoors when the exhaust valve is in the open state;
a return valve disposed between the exhaust region and the fresh air region, the return valve allowing air in the exhaust region to enter the fresh air region in an open state, and preventing air in the exhaust region from entering the fresh air region in a closed state; and
a control unit configured to: receive the indoor temperature detected by the temperature sensor; compare the indoor temperature with a predetermined temperature threshold; and in response to the indoor temperature exceeding the predetermined temperature threshold, open the inlet valve, the exhaust valve, and the exhaust fan, and close the return valve; and
a main cooling system comprising a cooling tower, a heat exchanging device, and a blower, the cooling tower being disposed outside the room and connected to the heat exchanging device through a supply pipe and a return pipe, the heat exchanging device being disposed in the fresh air region to cool air in the fresh air region, and the blower being disposed in the fresh air region to guide air cooled by the heat exchanging device to an electronic device to be cooled.

19. The data center cooling system of claim 18, wherein the emergency cooling system further comprises a pressure sensor configured to detect an indoor pressure of the room,
wherein the control unit is further configured to: receive the indoor pressure detected by the pressure sensor; compare the indoor pressure with a predetermined pressure threshold; and in response to the indoor temperature exceeding the predetermined temperature threshold and the indoor pressure exceeding the predetermined pressure threshold, open the inlet valve, the exhaust valve, and the exhaust fan, and close the return valve.

20. The data center cooling system of claim 18, wherein the control unit is further configured to:
in response to the indoor temperature not exceeding the predetermined temperature threshold, determine whether an outdoor environmental condition satisfies a predetermined criteria; and
in response to the outdoor environmental condition satisfying the predetermined criteria, open the inlet valve, the exhaust valve, and the exhaust fan.

* * * * *